United States Patent [19]

Appalucci et al.

[11] Patent Number: 5,142,270
[45] Date of Patent: Aug. 25, 1992

[54] STABILIZED RESONANT TAG CIRCUIT AND DEACTIVATOR

[75] Inventors: Lawrence C. Appalucci, Villanova, Pa.; Luis F. Ortiz, Ponce, P.R.

[73] Assignee: Checkpoint Systems Inc., Thorofare, N.J.

[21] Appl. No.: 703,932

[22] Filed: May 22, 1991

[51] Int. Cl.$^5$ .................. G08B 13/14; H01Q 1/36
[52] U.S. Cl. .................................. 340/572; 343/895
[58] Field of Search ............... 340/572, 551; 343/895; 361/395, 400–402, 404, 408; 29/841; 156/272.2

[56] References Cited

U.S. PATENT DOCUMENTS

| | | | |
|---|---|---|---|
| 3,913,219 | 10/1975 | Lichtblau | 29/592 |
| 4,021,705 | 5/1977 | Lichtblau | 361/402 |
| 4,369,557 | 1/1983 | Vandebult | 29/25.42 |
| 4,413,254 | 11/1983 | Pinneo et al. | 340/572 |
| 4,471,344 | 9/1984 | Williams | 340/572 |
| 4,498,076 | 2/1985 | Lichtblau | 340/572 |
| 4,598,276 | 7/1986 | Tait | 340/572 |
| 4,700,179 | 10/1987 | Fancher | 340/572 |
| 4,717,438 | 1/1988 | Benge et al. | 156/152 |
| 4,778,552 | 10/1988 | Benge et al. | 156/272.2 |
| 4,783,646 | 11/1988 | Matsuzaki | 340/572 |
| 4,792,790 | 12/1988 | Reeb | 340/572 |
| 4,802,944 | 2/1989 | Benge | 156/247 |
| 4,818,312 | 4/1989 | Benge | 156/62 |
| 4,823,234 | 4/1989 | Konishi et al. | 361/395 X |
| 4,843,404 | 6/1989 | Benge et al. | 343/895 |
| 4,846,922 | 7/1989 | Benge et al. | 156/324 |
| 4,864,280 | 9/1989 | van der Meij | 340/572 |
| 4,910,499 | 3/1990 | Benge et al. | 340/572 |
| 4,940,966 | 7/1990 | Pettigrew et al. | 340/572 X |
| 4,954,814 | 9/1990 | Benge | 340/572 |
| 4,960,651 | 10/1990 | Pettigrew et al. | 340/572 X |

Primary Examiner—Jin F. Ng
Assistant Examiner—Thomas J. Mullen, Jr.
Attorney, Agent, or Firm—Panitch, Schwarze, Jacobs & Nadel

[57] ABSTRACT

A stabilized resonant tag circuit and deactivator therefore for use as an electronic article surveillance tag. The tag has a flexible substantially planar dielectric substrate having conductors positioned on either side, at least one of the conductors including an inductor. The tag is stabilized by a flexible, substantially planar, tear-resistant, polymeric film adhered to and covering one of the conductors and the substrate. The film provides a vapor barrier which minimizes the effects of body detuning on the circuit and promotes the secured integrity of the tag. Another embodiment of the present invention is a stabilized deactivatable resonant tag circuit, further including a deactivator for deactivating the tag in response to an electromagnetic field of sufficient energy to destroy the resonant properties of the circuit, the deactivator being an indented portion of at least one of the conductors such that the conductors are closer to each other at the indented portion than at the remainder of the conductor.

23 Claims, 1 Drawing Sheet

STABILIZED RESONANT TAG CIRCUIT AND DEACTIVATOR

FIELD OF THE INVENTION

The invention relates to resonant tag circuits and deactivators and, more particularly, to stabilization of such tags.

BACKGROUND OF THE INVENTION

Electronic article surveillance (EAS) systems help to deter the unauthorized removal of articles from a surveillance area. One aspect of this deterrence results from the visual observance of a component of an EAS system attached to an article to be protected, namely a resonant tag circuit attached to a particular article. Typical EAS systems involve passing articles having EAS tags attached thereto through an electromagnetic field of predetermined frequency generated in a controlled area. The tag circuit resonates at the frequency of the electromagnetic field, enabling the receiving component of an EAS system to detect the presence of the tag in the controlled area and indicate unauthorized removal of the tagged article from the protected premises. The legitimate removal of tagged articles from the premises may be accomplished by removal or deactivation of the tag circuit before the article is passed through the electromagnetic field.

Typical resonant tag circuits comprise a central dielectric layer and conductive layers on either side of the dielectric layer. For example, U.S. Pat. No. 4,598,276 discloses an EAS marker having a central dielectric layer and conductive spirals on opposite surfaces of the dielectric layer, including an inductive component, the resulting circuit resonating upon exposure to an electromagnetic field of a predetermined frequency.

In addition to the basic component layers of EAS tags described above, various outer or covering layers may be provided over the conductive layers. For example, U.S. Pat. Nos. 4,717,438 and 4,843,404 disclose tags having additional outer layers and a release sheet attached by means of an adhesive; U.S. Pat. No. 4,792,790 discloses a tag having outer layers of a light-transparent carrier material; and U.S. Pat. No. 4,413,254 discloses a tag having outer cover layers of paper or another insulating material.

Further, U.S. Pat. No. 4,369,557 discloses a tag having outer layers formed of an insulative substrate web having a low dissipation factor at a given frequency and a stable dielectric constant, such as polyethylene, polypropylene, polyester (Mylar), or polyisobutylene. The preferred web material disclosed is polyethylene because of its low cost and ease of bonding with aluminum foil.

Still further examples include U.S. Pat. No. 4,864,280 which discloses a tag having outer layers, one layer being an adhesive film and detachable cover sheet and the opposite layer being a paper film or film of synthetic plastics material. The possibility of printing on the latter layer is also discussed. U.S. Pat. No. 4,783,646 discloses a tag having outer polyester films for use as an insulating covering material which is less expensive than polyimide and facilitates the transmission of radio waves.

The prior art fails to recognize many unexpected advantages arising from the selection of a polymeric material as an outer layer for an EAS tag, particularly those advantages associated with a process including indenting or dimpling to fabricate deactivatable tags.

Deactivatable EAS tags are disclosed in U.S. Pat. No. 4,498,076, which is hereby incorporated by reference. This patent discloses deactivatable resonant tag circuits in which a portion of one conductor is indented into the central substrate layer such that the conductors on either side of the substrate are closer to each other at the indented portion than the remainder of the conductors. The tag is deactivated upon exposure to an electromagnetic field of a predetermined frequency, which causes an arc discharge between the conductors through the substrate at the indented portion. The electric arc vaporizes a portion of the conductors near the indented portion, thereby destroying the conductive path and deactivating the circuit. Alternatively, the arc forms a plasma with deposited metal between the conductors which permanently short-circuits the conductors and destroys the resonant frequency of the circuit.

Other examples of deactivatable tags are disclosed in the prior art, such as U.S. Pat. No. 4,021,705, which discloses a deactivatable tag having a central layer of electrically insulative material with layers on either side of conductive material and at least one fusible link which can be fused by application of an energizing field to activate or alter the characteristics of the resonant circuit.

Further, U.S. Pat. Nos. 4,778,552, 4,802,944, 4,818,312, 4,846,922, 4,910,499, and 4,954,814 disclose deactivatable tags having an internal non-conductive layer between two conductive layers and outer layers and a release sheet releasably adhered by an adhesive to one of the outer layers.

SUMMARY OF THE INVENTION

One aspect of the present invention is a resonant tag circuit for use as an electronic article surveillance tag, having a flexible substantially planar dielectric substrate. A first conductor is positioned on the first side of the dielectric substrate, and a second conductor is positioned on the second side of the dielectric substrate, while at least one of the conductors comprises an inductor. A flexible, substantially planar, tear resistant, polymeric film is adhered to and covers one of the conductors and the substrate on the side of the substrate opposite to the side which is to be adhered to an article subject to surveillance. The film provides a vapor barrier for the tag, minimizing effects of body detuning on the circuit and promoting the secured integrity of the tag while maintaining the flexibility thereof.

Another aspect of the invention is a deactivatable resonant tag circuit having a predetermined resonant frequency for use as an electronic article surveillance tag, which includes means for deactivating the resonant tag circuit in response to an electromagnetic field of sufficient energy to destroy the resonant properties of the circuit. The deactivating means includes a portion of at least one of the conductors which is indented in the substrate such that the conductors are closer to each other at the indented portion than at the remainder of the conductor. A flexible, substantially planar, tear resistant, polymeric film is adhered to and covers the conductor and the substrate on the side of the substrate opposite to the side which is to be adhered to an article subject to surveillance. The film provides a vapor barrier for the tag minimizing effects of body detuning on the circuit, and promoting the secured integrity of the tag while maintaining the flexibility thereof. In addition, as described below, the film provides unexpected advantages in the formation of the deactivation means in the tag.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed. In the drawings.

DETAILED DESCRIPTION OF THE PREFERRED EMBODIMENT

Figure 1:
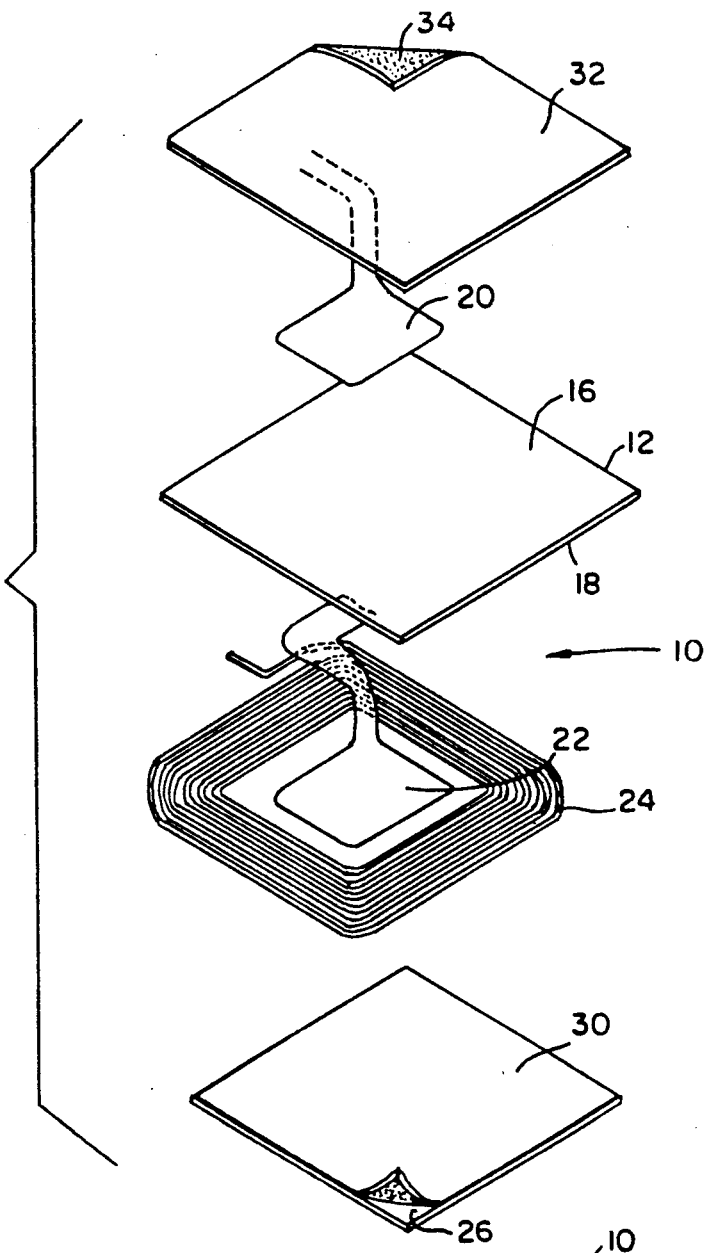
FIG. 1 is a an exploded perspective view of an electronic article surveillance tag in accordance with the present invention.
Figure 2:
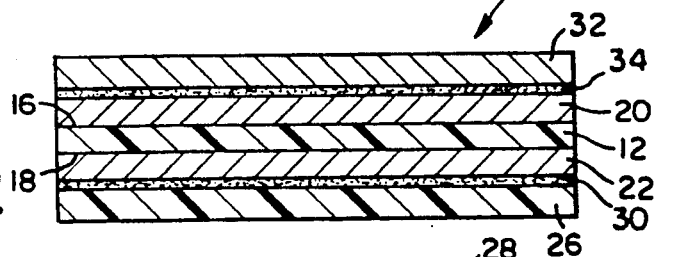
FIG. 2 is a cross-sectional view of a portion of an article surveillance tag in accordance with the present invention.

Referring to the drawings, wherein like numerals indicate like elements throughout, there is shown in FIGS. 1 and 2 a preferred embodiment of a resonant tag circuit, generally designated 10, for use as an electronic article surveillance tag in accordance with the present invention.

Referring now to FIG. 1, the resonant tag circuit 10 includes a dielectric substrate 12. In the present embodiment, the dielectric substrate 12 is preferably both flexible and substantially planar. The aforementioned characteristics of the dielectric substrate are particularly useful in fabrication of the resonant tag circuit 10, enabling a series of tags 10 to be fabricated from a continuous web, as is well-known in the art. Flexibility also allows the resonant tag circuit 10 to be attached to a variety of articles (not shown) having non-planar surfaces In the present embodiment, the dielectric substrate 12 is made from a polymeric material, preferably polyethylene. However, it will be recognized by those skilled in the art that the dielectric substrate 12 may be made from a variety of polymeric materials, including polyvinyl chloride, polystyrene, and other engineering thermoplastics which will be evident to those skilled in the art.

As best shown in FIG. 1, the dielectric substrate 12 includes a first side 16 and a second side 18. A first conductor 20 is positioned on the first side 16 of the dielectric substrate 12. The resonant tag circuit 10 further includes a second conductor 22 positioned on the second side 18 of the dielectric substrate 12. At least one of the conductors 20, 22 further includes an inductor 24. The first and second conductors 20, 22 together form an inductive-capacitance circuit.

In the present embodiment, it is preferred that each of the conductors 20, 22 be substantially planar and flexible. The conductors 20, 22 are preferably made from aluminum, specifically aluminum foil. However one of ordinary skill in the art would understand that other conductive materials, such as copper or nickel, may be used for the conductors 20, 22. Further, one of ordinary skill in the art would understand that the conductors 20, 22 may be made from different conductive materials.

The preferred thickness of the conductors 20, 22 is approximately 3 mils, although the conductors 20, 22 may be of any thickness in keeping with the spirit and scope of the present invention.

It is preferred that the inductor 24 be generally formed in a spiral path surrounding the conductive portion of the conductor 22, as best shown in FIG. 1, although the inductor 24 may be formed in other configurations.

The conductors 20, 22 are preferably formed on the first and second sides 16, 18 of the dielectric substrate 12 by an extrusion coating process (not shown). One of ordinary skill in the art would understand that the process of forming the basic tag structure comprising the conductors 20, 22 and the inductor 24 on the dielectric substrate 12 is not specifically pertinent to an understanding of the present invention and is well known in the prior art. Further description of this part of the fabrication process is not believed to be necessary nor is it limiting.

As best shown in FIG. 1, the resonant tag circuit 10 of the invention includes a polymeric film 26 adhered to and covering the conductor 22, inductor 24 and side 18 of dielectric substrate 12, i.e., the side of the substrate opposite to the side which is to be adhered to an article (not shown) subject to surveillance. One of ordinary skill in the art will understand that the polymeric film 26 may instead be adhered to and cover the conductor 20 and the side 16 of the dielectric substrate 12 if the side 18 of the substrate and conductor 22 are to be adhered to an article subject to surveillance. Alternatively, if desired, both conductors and both sides of the substrate may be covered with a polymeric film.

The polymeric film 26 is preferably both flexible and substantially planar to facilitate fabrication of the resonant tag circuit 10 and adherence of the tag 10 to non-planar surfaces on a wide variety of articles (not shown) to be protected by an electronic article surveillance system. Preferably, the polymeric film 26 is also tear resistant, thus promoting the secured integrity of the tag 10 while maintaining the flexibility thereof.

It is preferred that the polymeric film 26 provide a vapor barrier for the adjacent conductor 22 and dielectric substrate 12, thus eliminating the need for a film overlaminate. Further, the polymeric film 26 minimizes the effects of body detuning on the resonant tag circuit 10.

Use of the polymeric film 26 in the tag 10 is advantageous in that the polymeric film 26 resists warping or shrinkage, thereby providing a substantially smooth, wrinkle-free printing surface opposite the conductor 22. The smooth, wrinkle-free printing surface which results from use of a polymeric film 26 facilitates printing of prices and other information on the tag 10.

Those skilled in the art would recognize the prior art practice of adhering paper to both sides of the resonant tag circuit 10 to cover the conductors 20, 22 and stabilize the laminate. Typically, the thickness of such paper is on the order of 3.5 to 4 mils. In contrast, the polymeric film 26 of the present invention has a thickness not greater than about 2 mils. By using an outer layer of polymeric film 26 on one side of the tag 10 instead of a paper layer, the total thickness of the tag may be reduced from about 9 mils to less than about 7 mils. The use of polymeric film 26 allows the tags 10 to be printed upon in thermal, laser, and other printers having minimal printing clearances in which it was not possible to print on a paper-covered tag before. The thinner, more pliable tag 10 also reduces the pressure on printer heads.

The polymeric film 26 is preferably made from polyester, although one of ordinary skill in the art understands that other polymeric materials such as polyethylene, polyvinyl chloride, and other plastics may be used. A preferred polyester film 26 may be, for example, Mylar, which is commercially available from E. I. DuPont de Nemours & Co., Inc. of Wilmington, DE. Mylar is available in a variety of colors. The fabrication of resonant tag circuits 10 using a variety of colored Mylars may be advantageous in that different colored Mylars could provide visual differentiation between tags which resonate at different frequencies. An outer layer of thermal printing paper (not shown) is added to the layer of Mylar which allows the tags to be printed upon in thermal printers Another preferred polyester film 26 is Melinex, which is commercially available from ICI Americas Inc. of Wilmington, Delaware. Where a non-thermal printer is to be used, the polyester film may be coated with a layer which accepts inks or toners for non-thermal printing. Such a printable film is the commercially available product 200 Dukote CITC (DK-393) of Dunmore Corp. of Newtown, PA, which is a specially coated Melinex film.

The polymeric film 26 preferably has a moisture absorption less than 0.8% as measured in accordance with ASTM D570-63. The low moisture absorption is particularly advantageous in that a smooth, wrinkle-free printing surface and substantially consistent heat transfer properties are maintained which provide for easier fabrication of deactivatable resonant tag circuits 28.

It is also preferred that the polymeric film 26 has a tensile strength greater than 26,000 psi in the machine direction as measured in accordance with ASTM D882-80. The high tensile strength is indicative of the properties inherent to polymeric materials which contribute to the tear resistance of the polymeric film 26 and promote the secured integrity of the resonant tag circuit 10 while maintaining the requisite flexibility thereof. High tensile strength also allows use of a polymeric film 26 of a thickness of less than about 2 mils, i.e., less than the thickness of paper used as outer layers in tags disclosed in the prior art.

The resonant tag circuit 10 further includes a pressure sensitive adhesive layer 30 which adheres the polymeric film 26 to the conductor 22 and side 18 of the substrate 12, although it is understood that a non-pressure sensitive adhesive may be used. It is preferred that the adhesive layer 30 has a thickness not greater than about 0.5 mils.

Preferably, the resonant tag circuit 10 further includes a release liner 32, such as paper or plastic film, which is releasably adhered by a pressure sensitive adhesive 34 to the conductor 20 and dielectric substrate 12 on the opposite side 16 from the polymeric film 26. One of ordinary skill in the art would understand that the release liner 32 may be removed from the tag 10 prior to attachment of the tag 10 to the article to be protected. It is preferred that the release liner 32 have a thickness not greater than about 2.5 mils, although one of ordinary skill in the art would understand that a release liner having a thickness greater than 2.5 mils could be used in conjunction with the present tag 10.

Figure 3:
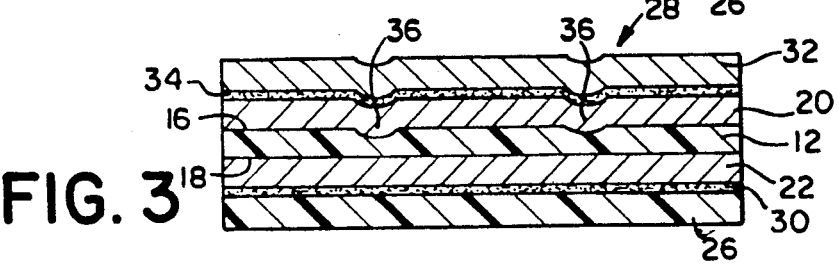
FIG. 3 is a cross-sectional view of a portion of a deactivatable electronic article surveillance tag in accordance with the present invention.

Another aspect of the invention relates to use of a polymeric film 26 as an outer layer for a deactivatable resonant tag circuit 28, best shown in FIG. 3. The deactivatable resonant tag circuit 28 is substantially similar to the resonant tag circuit 10, however the deactivatable tag 28 further includes means for deactivating the tag 28 in response to an electromagnetic field (not shown) of sufficient energy to destroy the resonant properties of the tag circuit 28. The deactivating means comprises an indented portion or portions 36 (sometimes referred to as "dimples") of the conductor 20 which is indented into the substrate 12 such that the conductors 20, 22 are closer to each other at the indented portion 36 than over the remainder of the conductor 20. One of ordinary skill in the art would understand that either or both of the conductors 20, 22 may be indented into the substrate 12 in keeping with the spirit and scope of the invention. However, it is presently preferred that the indented portion(s) 36 be located on the opposite side of the substrate 12 from the side bearing the polymeric film 26.

The deactivatable resonant tag circuit 28 is destroyed by an arc discharge (not shown) between the conductors 20, 22 and through the substrate 12 at the indented portion 36. The electric arc vaporizes a portion (not shown) of the conductors 20, 22 proximate the indented portion 36, thereby destroying the conductive path and deactivating the circuit. Alternatively, the arc forms a plasma of deposited metal between the conductors causing a short-circuit and destroying the resonant capabilities of the tag 10. The process by which the tag 28 is deactivated is explained at length in U.S. Pat. No. 4,498,076.

The preferred process for fabricating the deactivatable tags 28 is set forth generally in U.S. Pat. No. 3,913,219 of G. Lichtblau, which is hereby incorporated by reference. One of ordinary skill in the art would understand that other similar processes may be used in keeping with the spirit and scope of the present invention.

Generally a roll of etched circuits which comprise a dielectric substrate covered on either side by a layer of conductors are joined with a polymeric film which is carried on a matrix carrier. Prior to joining of the polymeric film and the etched circuits, adhesive is applied to the surface of the polymeric film to be joined to the etched circuits. The etched circuits and film are joined by pressure applied by a pressure roll.

The joined etched circuits an film together form a stabilized resonant tag web. The stabilized resonant tag web may be passed through a dimpling (indenting) roll in order to form the indented portions best shown in FIG. 3.

After emerging from the dimpling roll, the dimpled web is coated with a pressure sensitive adhesive 34 in order that a release liner 32 and optional thermal printing paper, if desired, may be joined to the dimpled web. The adhesive 34 may be of a pressure sensitive type, however one of ordinary skill in the art would understand that non-pressure sensitive adhesives may be used.

The dimpled web and release liner 32 are passed between an anvil roll and a dye-cut cylinder in order to separate the matrix carrier from the polymeric film, the matrix carrier being collected on a matrix roll. After the matrix roll is separated from the dimpled web, the final web of deactivatable resonant tag circuits may be stored on a roll.

The use of a polymeric film 26 is particularly advantageous in the present process because the polymeric film 26 allows substantially consistent heat transfer in any portions of the tag fabrication process which may involve the application of heat. The consistent heat transfer characteristics are due in part to the uniformity in thickness obtainable by extrusion of the polymeric material. Other desirable advantages of using a polymeric film 26 include low moisture absorption which allows more consistent heat transfer and high tensile strength which allows use of a polymeric film 26 of approximately 2 mils thickness.

From the foregoing description, it can be seen that the present invention comprises a stabilized resonant tag circuit and deactivator for use as an electronic article surveillance tag. It will be appreciated by those skilled in the art that changes could be made to the embodiments described above without departing from the broad inventive concept thereof. It is understood, therefore, that this invention is not limited to the particular embodiment disclosed, but it is intended to cover modifications which are within the spirit and scope of the invention as defined by the appended claims.

We claim:

1. A resonant tag circuit for use as an electronic article surveillance tag, comprising:
    a flexible substantially planar dielectric substrate having a first side and a second side;
    a first conductor positioned on said first side of said dielectric substrate;
    a second conductor positioned on said second side of said dielectric substrate, wherein at least one of said conductors comprises an inductor; and
    a flexible, substantially planar, tear resistant, polymeric film adhered to and covering one of said conductors and said substrate on the side of said substrate opposite to the side which is to be adhered to an article subject to surveillance, said film providing a vapor barrier for said one conductor and substrate minimizing effects of body detuning on said circuit, and promoting the secured integrity of said tag while maintaining the flexibility thereof.

2. A resonant tag circuit according to claim 1, whereby said polymeric film resists warping or shrinkage, thereby providing a substantially smooth, wrinkle-free printing surface opposite said conductor.

3. A resonant tag circuit according to claim 1, wherein said tag has a thickness not greater than about 7 mils.

4. A resonant tag circuit according to claim 1, wherein said dielectric substrate comprises a polymeric material 5. A resonant tag circuit according to claim 4, wherein said dielectric substrate comprises polyethylene.

6. A resonant tag circuit according to claim 1, wherein said conductor comprises aluminum.

7. A resonant tag circuit according to claim 1, wherein said polymeric film is a polyester.

8. A resonant tag circuit according to claim 1, wherein said polymeric film has a thickness not greater than about 2 mils.

9. A resonant tag circuit according to claim 1, wherein said polymeric film has a moisture absorption less than about 0.8 percent.

10. A resonant tag circuit according to claim 1, wherein said polymeric film has a tensile strength greater than about 26,000 psi.

11. A resonant tag circuit according to claim 1, wherein a pressure sensitive adhesive means adheres said polymeric film to said one conductor and substrate, said adhesive means having a thickness not greater than about 0.5 mils.

12. A resonant tag circuit according to claim 1, wherein said tag further comprises a release liner releasably adhered to said conductor and substrate on the opposite side from said polymeric film.

13. A deactivatable resonant tag circuit having a predetermined resonant frequency for use as an electronic article surveillance tag, comprising:
    a flexible substantially planar dielectric substrate having a first side and a second side;
    a first conductor positioned on said first side of said dielectric substrate;
    a second conductor positioned on said second side of said dielectric substrate, wherein at least one of said conductors comprises an inductor;
    means for deactivating said resonant tag circuit in response to an electromagnetic field of sufficient energy to destroy the resonant properties of said circuit, said deactivating means comprising a portion of at least one of said conductors which is indented in said substrate such that said conductors are closer to each other at said indented portion than the remainder of the conductor; and
    a flexible, substantially planar, tear resistant, polymeric film adhered to and covering one of said conductors and said substrate on the side of said substrate opposite to the side which is to be adhered to an article subject to surveillance, said film providing a vapor barrier for said one conductor and substrate minimizing effects of body detuning on said circuit, and promoting the secured integrity of said tag while maintaining the flexibility thereof.

14. A deactivatable resonant tag circuit according to claim 13, wherein said polymeric film resists warping or shrinkage, thereby providing a substantially smooth, wrinkle-free printing surface opposite said conductor.

15. A deactivatable resonant tag circuit according to claim 13, wherein said tag has a thickness not greater than about 7 mils.

16. A deactivatable resonant tag circuit according to claim 13, wherein said dielectric substrate comprises a polymeric material.

17. A deactivatable resonant tag circuit according to claim 13, wherein said conductor comprises aluminum.

18. A deactivatable resonant tag circuit according to claim 13, wherein said polymeric film is a polyester.

19. A deactivatable resonant tag circuit according to claim 13, wherein said polymeric film has a thickness not greater than about 2 mils.

20. A deactivatable resonant tag circuit according to claim 13, wherein said polymeric film has a moisture absorption less than about 0.8 percent.

21. A deactivatable resonant tag circuit according to claim 13, wherein said polymeric film has a tensile strength greater than about 26,000 psi.

22. A deactivatable resonant tag circuit according to claim 13, wherein a pressure sensitive adhesive means adheres said polymeric film to said one conductor and substrate, said adhesive means having a thickness not greater than about 0.5 mils.

23. A deactivatable resonant tag circuit according to claim 13, wherein said tag further comprises a release liner releasably adhered to said conductor and substrate on the opposite side from said polymeric film.

* * * * *